United States Patent
O'Lenick, Jr.

(10) Patent No.: US 6,841,649 B1
(45) Date of Patent: Jan. 11, 2005

(54) FLUORO ALKYL DIMETHICONE ESTERS

(76) Inventor: Anthony J. O'Lenick, Jr., 2170 Luke Edwards Rd., Dacula, GA (US) 30019

( * ) Notice: Subject to any disclaimer, the term of this patent is extended or adjusted under 35 U.S.C. 154(b) by 0 days.

(21) Appl. No.: 10/694,055

(22) Filed: Oct. 27, 2003

Related U.S. Application Data

(63) Continuation-in-part of application No. 10/289,512, filed on Nov. 8, 2002, now Pat. No. 6,727,340.

(51) Int. Cl.$^7$ .............................................. C08G 77/12
(52) U.S. Cl. ............................. 528/31; 528/26; 528/29; 528/25
(58) Field of Search ............................. 528/31, 26, 29, 528/25

(56) References Cited

U.S. PATENT DOCUMENTS 5,446,114 A    8/1995  O'Lenick
5,473,038 A  * 12/1995  O'Lenick, Jr. ............... 528/15

* cited by examiner

Primary Examiner—Kuo-Liang Peng

(57) ABSTRACT

The present invention relates to novel dimethicone copolyol ester compounds bearing a fluoro group attached through a hydrophobic ester linkage to silicon. This invention also relates a series of such products having differing solubility, silicone fluoro and soluble groups. By careful selection of the compounds so constructed, very efficient couplers that minimize syneresis.

15 Claims, No Drawings

FLUORO ALKYL DIMETHICONE ESTERS

RELATED APPLICATIONS

The present application is a continuation-in-part of application Ser. No. 10/289,512 filed Nov. 8, 2002 now U.S. Pat. No. 6,727,340.

BACKGROUND OF THE INVENTION

1. Technical Field of the Invention

The present invention relates to novel fluoro dimethicone ester compounds in which the fluoro group is attached to the silicon atom through a fatty group by means of an ester linkage, and an oil soluble group is connected to a different silicon atom. This invention also relates a series of such products having differing amounts of silicone soluble groups, fatty soluble groups and fluoro-soluble groups, but no water soluble groups. By careful selection of the compounds so constructed, that can prevent syneresis in lipstick and other solid products. The present invention is directed toward a molecule that has no water soluble group present. The parent case was directed to molecules having water soluble groups. We have now surprisingly found that the compounds that do not have water soluble groups provide compounds that minimize syneresis in lipstick and other pigmented products. By syneresis is meant the separation of compounds not soluble in each other present in a lipstick. These include silicone resin, waxes (hydrocarbon based) and fluoro compounds. The presence of each of these and the exclusion of the water soluble group provides this ability to couple the phases in a uniform product.

2. Description of the Arts

There have been several fluoro silicone compounds disclosed in the art. They include U.S. Pat. No. 5,446,114 to O'Lenick issued August 1995. This patent teaches that "the compounds of the invention are prepared by reacting a silanic hydrogen containing silicone polymer with a vinyl containing fluoro compound and an allyl alcohol alkoxylate." This results in a molecule with two functional groups water soluble groups and fluoro groups, both independently linked to a different silicon atom.

U.S. Pat. No. 5,473,038 to O'Lenick issued December 1995 teaches that "compounds of the invention are prepared by reacting a silanic hydrogen containing silicone polymer with a vinyl containing fluoro compound alpha olefin". This results in a molecule with two functional groups alkyl groups and fluoro groups, both independently linked to a different silicon atom.

U.S. Pat. No. 6,087,517 to O'Lenick issued July 2000, teaches "the invention relates to a series of novel silicone fluorinated dimethicone copolyol phosphates. The compounds of the invention are prepared by reacting a fluoro dimethicone copolyol disclosed in U.S. Pat. No. 5,446,144 with a suitable phosphating agent." This invention introduces a phosphate group onto the hydroxyl functional group of the compounds of U.S. Pat. No. 5,446,144. This results in a molecule with two functional groups alkyl groups and fluoro groups, both independently linked to a different silicon atom.

U.S. Pat. No. 6,008,397 to O'Lenick, issued Dec. 28, 1999, "discloses novel fluoro esters made by reacting (a) a carboxy silicone, and (b) the hydroxyl group of fluoro alcohol." The compounds of the '397 invention contain short linking groups derived from anhydrides and link the fluoro group through the water soluble group to one silicon atom.

We have surprisingly found that products made by the reaction of silicone methyl ester having 11 carbon atoms directly with the fluoro group, having an alkyl group on a different silicon atom and lacking any dimethicone copolyol group, are not emulsifiers but provide outstanding vert thin highly lubricious coatings for hair skin and fiber.

We have also surprisingly found that by having a bulky alkyl group linked to silicone, unique skin feel and conditioning properties result. The compounds of the prior art have the ester moiety linked through a water-soluble polyoxyalkylene group, resulting in a surface-active agent with different properties than the compounds of the present invention.

SUMMARY OF THE INVENTION

The present invention is directed toward the providing a series of novel silicone compounds that have a C-11 alkyl group linked through an ester linkage to a fluoro group and a silicon atom on opposite ends of the molecule. One side of the C-11 is linked through a carbon silicon bond and on the other end of the C-11 group is linked a fluoro group. An alkyl group is likewise linked directly to another silicon group.

The compounds of the present invention have the formula:

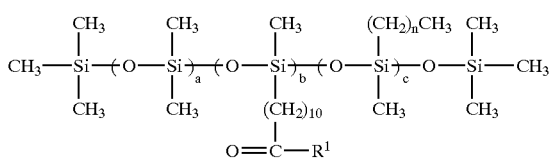

wherein;
a is an integer ranging from 0 to 2000;
b is an integer ranging from 1 to 20;
c is an integer ranging from 1 to 20;
n is an integer ranging from 10 to 20;
$R^1$ is

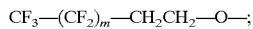

m is an integer ranging from 3 to 18.

DETAILED DESCRIPTION OF THE INVENTION

Objective of the Invention

It is the object of the present invention is the provision of a series of novel silicone compounds that have specific hydrophilic ester groups linked through an 11-carbon linkage directly to silicon in a dimethicone backbone Detailed Description of the Invention The compounds of the present invention conform to the formula;

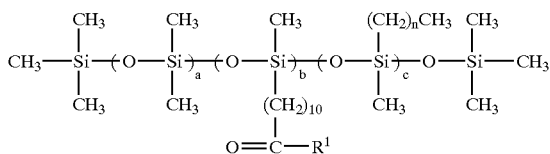

wherein;
a is an integer ranging from 0 to 2000;
b is an integer ranging from 1 to 20;
c is an integer ranging from 1 to 20;
n is an integer ranging from 10 to 20;
$R^1$ is

The products are made by reacting the following compounds with fluoro alcohols to give the compounds of the present invention.

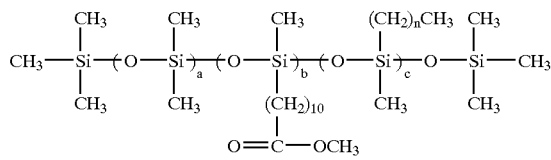

wherein;
a is an integer ranging from 0 to 2000;
b is an integer ranging from 1 to 20;
c is an integer ranging from 1 to 20;
n is an integer ranging from 10 to 20.

The methyl ester is prepared by the hydrosilylation reaction of a silicone polymer and specific alpha vinyl compounds.

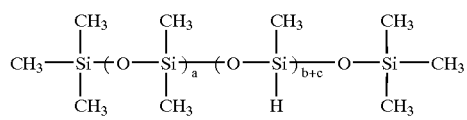

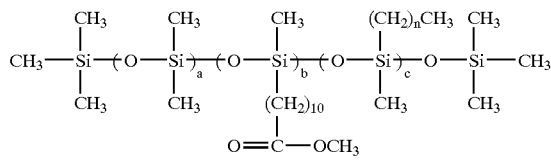

wherein;
a is an integer ranging from 0 to 2000;
b is an integer ranging from 1 to 20;
c is an integer ranging from 1 to 20;
n is an integer ranging from 10 to 20.

The preparation of the intermediate is critical to the synthesis of the compounds of the present invention. If one tries to hydrosilylate a carboxylic acid directly, the reaction fails. The carboxylic acid group reacts with the Si—H and the desired product is not achieved. The hydrosilylation using the methyl ester however is essentially quantitative and proceeds to give the desired produce. An alternative synthesis giving the same productr is to react the methyl undecylenate with the fluoro alcohol to make a fluoro ester, then hydrosilylaying the resulting ester.

Preferred Embodiments

In a preferred embodiment of the silicone polymer set d is 0.

In a preferred embodiment of the silicone polymer set d is an integer ranging from 1 to 20.

In a preferred embodiment of the silicone polymer set b in an integer ranging from 1 to 5.

In a preferred embodiment of the silicone polymer set b is an integer ranging from 6 to 20.

In a preferred embodiment of the silicone polymer set c is an integer ranging from 1 to 5.

In a preferred embodiment of the silicone polymer set c in an integer ranging from 6 to 20.

In a preferred embodiment of the silicone polymer set a is an integer ranging from 1 to 5.

In a preferred embodiment of the silicone polymer set a in an integer ranging from 6 to 20.

EXAMPLES

Raw Materials

Polymer Synthesis

Preparation of Silanic Hydrogen Containing Intermediates

Silicone intermediates of the type used to make the compounds of this invention are well known to those skilled in the art. International Publication (Silicone Alkylene Oxide Copolymers As Foam Control Agents) WO 86/0541 by Paul Austin (Sep. 25, 1986) p. 16 (examples 1 to 6) teaches how to make the following intermediates, and is incorporated herein by reference.

Hydrosilylation

Silanic Hydrogen Containing Compounds (Comb Type)

The polymers used as raw materials are known to those skilled in the art and conform to the following structure:

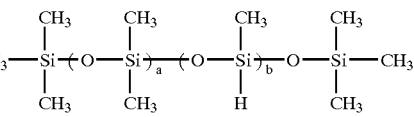

Compounds of this type are available from Siltech Corporation Toronto Ontario Canada.

| Example | Austin Example | a | b | Average Molecular Weight | Equivalent Molecular |
|---|---|---|---|---|---|
| 1 | 1 | 20 | 3 | 1,850 | 551 |
| 2 | 4 | 160 | 5 | 24,158 | 4,831 |
| 3 | 6 | 20 | 10 | 2,258 | 225 |

Compounds of this type are also available commercially from Siltech Corporation Toronto Ontario Canada. The structures are determined using silicone nmr and the chemistries were described using experimentally determined structures. Trade names are given merely for reference.

| Example | Siltech Name | a | b |
|---|---|---|---|
| 4 | Siltech D-116 | 9 | 4 |
| 5 | Siltech H-345 | 22 | 5 |
| 6 | Siltech C-106 | 50 | 10 |
| 7 | Siltech ZZ-302 | 70 | 20 |
| 8 | Siltech XX-456 | 50 | 60 |
| 9 | Siltech J-456 | 10 | 20 |
| 10 | Siltech G-456 | 0 | 60 |

2. Methyl Undecylenate

Example 11

Methyl undecylenate is an item of commerce and conforms to the following structure:

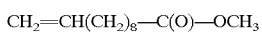

As previously stated, the reaction requires the reaction of an ester, not the acid directly. The reason for this is that is the reaction is conducted using undecylenic acid the acid group reacts with the Si—H and does not give the desired product. This is a critical unappreciated step in the practice of this technology.

3. Alpha Olefin

Alpha olefins are items of commerce and are available from a variety of sources including Chevron. They conform to the following structure:

$$CH_2=CH-(CH_2)_sCH_3$$

s is an integer ranging from 3 to 50 and is equal to n-2.

| Example | s |
|---------|----|
| 12 | 8 |
| 13 | 10 |
| 14 | 12 |
| 15 | 14 |
| 16 | 18 |

Hydrosilylation

The hydrosilylation reaction used to make the compounds of this invention is well known to those skilled in the art. One of many references is International Publication (Silicone Alkylene Oxide Copolymers As Foam Control Agents) WO 86/0541 by Paul Austin (Sep. 25, 1986) p.19.

General Reaction Process (Hydrosilylation)

To a suitable flask fitted with a mechanical agitator, thermometer with a Therm-o-watch temperature regulator, nitrogen sparge tube vented reflux condenser and heating mantle is added the specified quantity of methyl undecylenate (example 11), and alpha olefin (examples 12–16) examples. Next is added the specified number of grams of the specified hydrosilylation intermediate (Example # 1–10) and isopropanol. The temperature is increased to 85 C and 3.5 ml of 3% $H_2PtCl_6$ in ethanol is added. An exotherm is noted to about 95 C, while the contents are stirred for about 2 hours. During this time silanic hydrogen concentration drops to nil. Cool to 65 C and slowly add 60 g of sodium bicarbonate. allow to mix overnight and filter through a 4-micron pad. Distill off any solvent at 100 C and 1 torr.

Example 17

To a suitable flask fitted with a mechanical agitator, thermometer with a Therm-o-watch temperature regulator, nitrogen sparge tube vented reflux condenser and heating mantle is added 200.0 grams of methyl undecylenate (example 11), 252.4 grams of alpha olefin (example 16), 1687.7 grams of hydrosilylation intermediate (Example # 15) and 750 grams of isopropanol. Heat to 85 C and add 3.5 ml of 3% H 2 PtCl 6 in ethanol. An exotherm is noted to about 95 C, while the contents are stirred for about 2 hours. During this time silanic hydrogen concentration drops to nil. Cool to 65 C and slowly add 60 g of sodium bicarbonate. allow to mix overnight and filter through a 4-micron pad. Distill off any solvent at 100 C and 1 torr.

Examples 18–27

| Example | Silanic Polymer Example | Silanic Polymer Grams | Example 11 Grams | Alpha Olefin Example | Alpha Olefin Grams |
|---------|---------|--------|--------|---------|--------|
| 18 | 1 | 2600.8 | 281.0 | 12 | 154.0 |
| 19 | 2 | 2617.0 | 42.0 | 13 | 182.0 |
| 20 | 3 | 497.1 | 218.0 | 14 | 210.0 |
| 21 | 4 | 703.4 | 129.5 | 15 | 238.0 |
| 22 | 5 | 1522.5 | 286.4 | 16 | 268.0 |
| 23 | 6 | 522.7 | 46.1 | 12 | 308.0 |
| 24 | 7 | 423.0 | 63.6 | 13 | 364.0 |
| 25 | 8 | 387.3 | 102.1 | 14 | 420.0 |
| 26 | 9 | 543.5 | 254.2 | 15 | 476.0 |
| 27 | 10 | 1360.6 | 710.0 | 16 | 536.0 |

Ester Preparation of Examples 28–38

The compounds made in examples 28—are methyl esters as prepared. They are reacted with fatty alcohols to produce the ester of the present invention. The reaction is as follows;

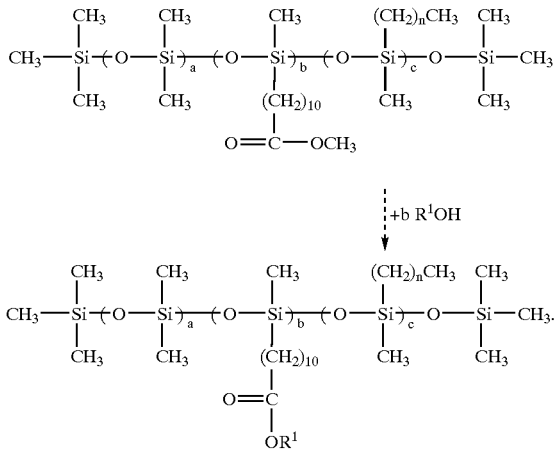

Raw Material Fluoro Alcohols

Fluoro Alcohols

Fluorine containing alcohols are commercially available from a variety of suppliers, most importantly Hoeschst Celanese and DuPonte Performance Products Division. They conform to the following structure;

$$CF_3-(CF_2)_mCH_2CH_2OH$$

| Reactant Example Number | m Value |
|---------|---------|
| 1 | 3 |
| 2 | 5 |
| 3 | 7 |
| 4 | 9 |
| 5 | 11 |
| 6 | 13 |
| 7 | 15 |
| 8 | 17 |

Example 28–37

In a suitable reaction flask equipped with a thermometer, heating mantle, and a condenser to remove methanol is added the specified amount of the specified silicone methyl ester is added the specified number grams of the specified alcohol (Examples Raw Material Example 1-Raw Material Example 8). The reaction mass is heated to 190° C. to 200° C. The reaction begins at about 170° C. Allow the methanol to distill off as the reaction proceeds. After the reaction progress is followed by hydroxyl value which meets theoretical within 12 hours.

|  | Methyl Ester | | Raw Material Alcohols | |
|---|---|---|---|---|
| Example | Example | Grams | Raw Material Example Number | Grams |
| 28 | 18 | 3035.8 | 1 | 264.0 |
| 29 | 19 | 2841.0 | 2 | 364.0 |
| 30 | 20 | 925.5 | 3 | 464.0 |
| 31 | 21 | 1070.9 | 4 | 564.0 |
| 32 | 22 | 2076.8 | 5 | 664.0 |
| 33 | 23 | 876.8 | 6 | 764.0 |
| 34 | 24 | 850.6 | 7 | 864.0 |
| 35 | 25 | 909.4 | 8 | 964.0 |
| 36 | 26 | 1273.7 | 1 | 280.0 |
| 37 | 27 | 2606.6 | 2 | 380.0 |

Applications Examples

The compounds of the present invention are clear liquids when molten. Some are liquid at ambient temperatures, others are waxy solids, depending upon the specific raw materials used for reaction. They make very thin films when applied to substrates including fiber, hair and skin. They are highly lubricious.

By careful selection of the compounds so constructed, that can prevent syneresis in lipstick and other solid products. The present invention is directed toward a molecule that has no water soluble group present. The parent case was directed to molecules having water soluble groups. We have now surprisingly found that the compounds that do not have water soluble groups provide compounds that minimize syneresis in lipstick and other pigmented products. By syneresis is meant the separation of compounds not soluble in each other present in a lipstick. These include silicone resin, waxes (hydrocarbon based) and fluoro compounds. The presence of each of these and the exclusion of the water soluble group provides this ability to couple the phases in a uniform product.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed:

1. A silicone polymer conforming to the following structure:

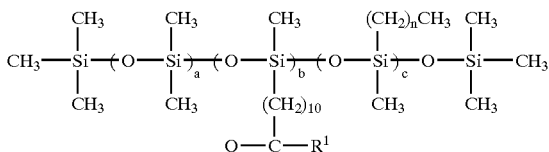

wherein:

a is an integer ranging from 0 to 2000;

b is an integer ranging from 1 to 20;

c is an integer ranging from 1 to 20;

n is an integer ranging from 10 to 20:

$R^1$ is

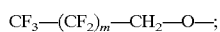

m is an integer ranging from 3 to 18.

2. A silicone polymer of claim 1 wherein c in an integer ranging from 1 to 5.
3. A silicone polymer of claim 1 wherein b is an integer ranging from 6 to 20.
4. A silicone polymer of claim 1 wherein c is an integer ranging from 1 to 5.
5. A silicone polymer of claim 1 wherein c in an integer ranging from 6 to 20.
6. A silicone polymer of claim 1 wherein a is an integer ranging from 1 to 5.
7. A silicone polymer of claim 1 wherein a in an integer ranging from 6 to 20.
8. A silicone polymer of claim 1 wherein m is 3.
9. A silicone polymer of claim 1 wherein m is 5.
10. A silicone polymer of claim 1 wherein m is 7.
11. A silicone polymer of claim 1 wherein m is 9.
12. A silicone polymer of claim 1 wherein m is 11.
13. A silicone polymer of claim 1 wherein m is 13.
14. A silicone polymer of claim 1 wherein m is 15.
15. A silicone polymer of claim 1 wherein m is 17.

* * * * *